United States Patent
Seo

(10) Patent No.: US 8,559,603 B2
(45) Date of Patent: *Oct. 15, 2013

(54) COMMUNICATION METHOD AND APPARATUS FOR PHONE HAVING VOICE RECOGNITION FUNCTION

(75) Inventor: Joung-Min Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,283

(22) Filed: Mar. 2, 2012

(65) Prior Publication Data

US 2012/0173233 A1 Jul. 5, 2012

Related U.S. Application Data

(63) Continuation of application No. 11/826,264, filed on Jul. 13, 2007, now Pat. No. 8,155,278.

(30) Foreign Application Priority Data

Aug. 22, 2006 (KR) .............................. 2006-0079396

(51) Int. Cl.
   *H04M 1/64* (2006.01)
(52) U.S. Cl.
   USPC ....................................................... 379/88.01
(58) Field of Classification Search
   USPC ....................................................... 379/88.01
   See application file for complete search history.

(56) References Cited

U.S. PATENT DOCUMENTS

| 5,604,790 | A  | * | 2/1997 | Grimes ...................... 379/88.04 |
| 6,532,447 | B1 | * | 3/2003 | Christensson ................ 704/275 |
| 7,027,842 | B2 | * | 4/2006 | Zhang et al. ............... 455/569.1 |

FOREIGN PATENT DOCUMENTS

KR   2001-0094229 A   10/2001

* cited by examiner

*Primary Examiner* — Alexander Jamal
(74) *Attorney, Agent, or Firm* — Roylance, Abrams, Berdo & Goodman, L.L.P.

(57) ABSTRACT

A method and apparatus for communicating through a phone having a voice recognition function are provided. The method of performing communication using a phone having a voice recognition function includes converting to an incoming call notification and voice recognition mode when a phone call is received; converting to a communication connection and speakerphone mode when voice information related to a communication connection instruction is recognized; performing communication using a speakerphone; and ending communication when voice information related to a communication end instruction is recognized during communication using the speakerphone. Therefore, when a phone call is received, a mode of a phone is converted to a speakerphone mode with a voice instruction using a voice recognition function, and thus communication can be performed without using a hand.

16 Claims, 6 Drawing Sheets

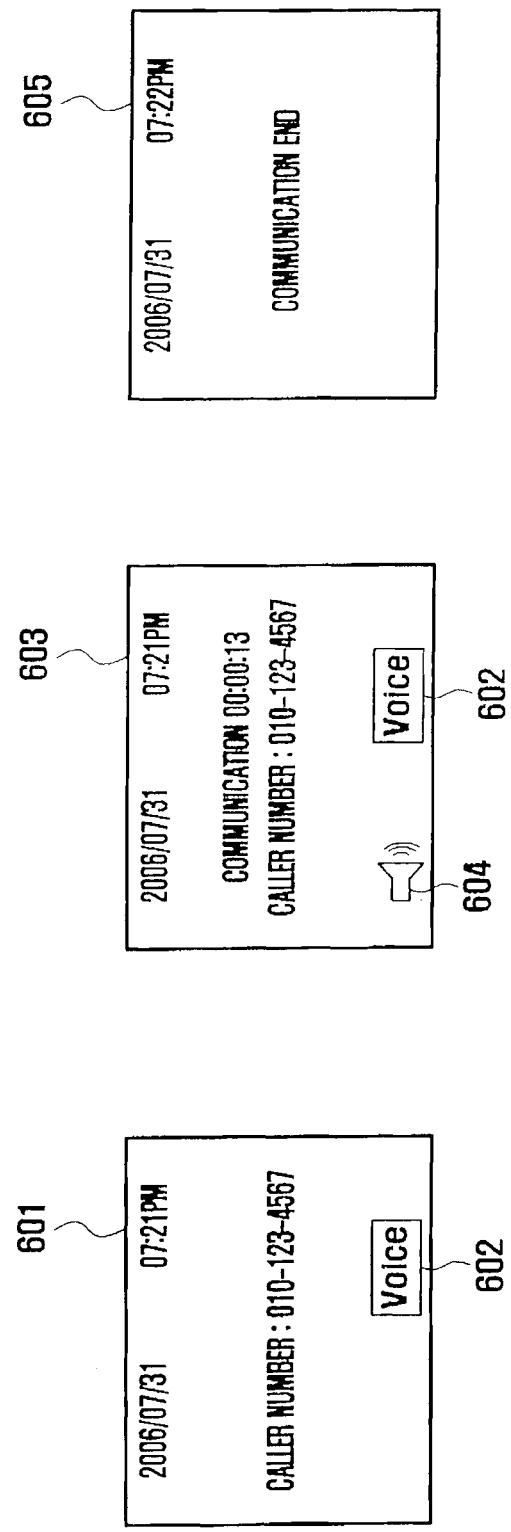

COMMUNICATION METHOD AND APPARATUS FOR PHONE HAVING VOICE RECOGNITION FUNCTION

CROSS-REFERENCE TO RELATED APPLICATION

This application is a continuation of U.S. patent application Ser. No. 11/826,264, filed Jul. 13, 2007 now U.S. Pat. No. 8,155,278, which claims the benefit under 35 U.S.C. §119(a) of Korean Patent Application Serial No. 2006-0079396, filed in the Korean Intellectual Property Office on Aug. 22, 2006, the entire disclosures of both of said applications being hereby incorporated by reference.

BACKGROUND OF THE INVENTION

1. Field of the Invention

The present invention relates to a phone. More particularly, the present invention relates to a method and apparatus for communicating in a speakerphone mode using a voice recognition technology.

2. Description of the Related Art

Recently, as voice recognition technology has developed, the practical uses of voice recognition technology have grown to comprise applications in communication technology. As a result, communication appliances have become easier to use. For example, when a user uses a phone as a communication appliance, if the user speaks a name of a person they want to call, the phone searches for the name among inputted name and phone number information stored in the phone's phone book and then calls to the stored phone number corresponding to the spoken name.

However, the user is often in a situation where it is inconvenient to input a key or touch a phone receiver due to performing normal day-to-day actions, such as dishwashing, giving a face massage, or carrying packages with both hands. In these cases, the user cannot receive a phone call, or receives a phone call but ends communication after sending a comment that the user is not in a good situation for communication with the caller.

Accordingly, there is a need for an improved communication appliance which can perform communication by converting an idle mode to a speakerphone mode using voice information when a phone call is received.

SUMMARY OF THE INVENTION

Exemplary embodiments of the present invention address at least the above problems and/or disadvantages and provide at least the advantages described below. Accordingly, an aspect of an exemplary embodiment of the present invention is to provide a method and apparatus that can perform communication by converting an idle mode to a speakerphone mode using voice information when a phone call is received.

In accordance with an aspect of an exemplary embodiment of the present invention, the above and other objects are accomplished by a method of communicating using a phone having a voice recognition function comprising converting to an incoming call notification and voice recognition mode when a phone call is received; converting to a communication connection and speakerphone mode when voice information related to a communication connection instruction is recognized; communicating using a speakerphone; and ending communication when voice information related to a communication end instruction is recognized during communication using the speakerphone.

In accordance with another aspect of an exemplary embodiment of the present invention, the above and other objects are accomplished by a phone having a voice recognition function and a speakerphone communication function, comprising a communication unit for communicating with other phones through a communication network; a microphone for receiving voice information; a speaker for converting an electrical signal to voice information and outputting the voice information; a voice recognition unit for recognizing voice information received through the microphone and outputting the recognized voice information; a storage unit for storing voice information regarding communication connection and communication end; and a controller for entering a communication connection and speaker communication mode when a voice recognition signal of communication connection is received from the voice recognition unit and ending communication when a voice recognition signal of communication end is received from the voice recognition unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which:

FIG. 6 is a diagram illustrating a screen for executing a speakerphone communication function according to an exemplary embodiment of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention relate to a method and apparatus for recognizing inputted voice information, if a user inputs preset voice information, when a phone call is received in a wired/wireless phone having a voice recognition function and a phone function. Function information corresponding to the recognized voice information is extracted from voice function information stored in a storage unit of the phone, and the extracted function is executed.

In exemplary embodiments of the present invention, the voice function information is information set by mapping function information to voice information so that a phone executes a specific function according to voice information inputted by a user.

Hereinafter, exemplary embodiments of the present invention are described in detail with reference to the accompanying drawings.

Figure 1:
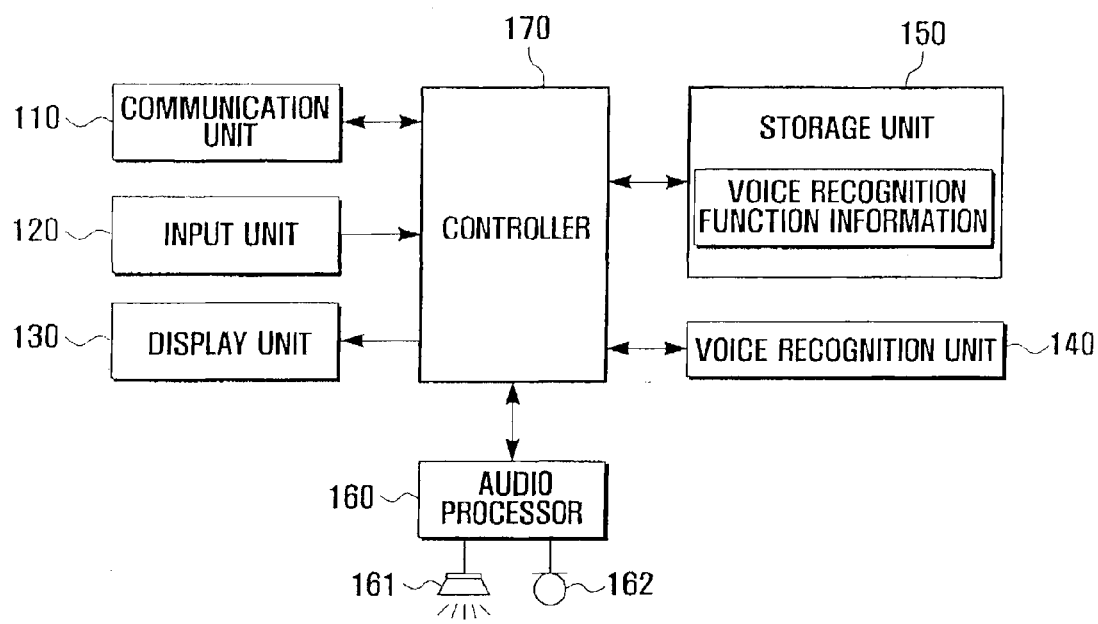
FIG. 1 is a diagram illustrating a configuration of a phone according to an exemplary embodiment of the present invention.

FIG. 1 is a diagram illustrating a configuration of a phone according to an exemplary embodiment of the present invention.

Referring to FIG. 1, a phone comprises a communication unit 110, an input unit 120, a display unit 130, a voice recognition unit 140, a storage unit 150, an audio processor 160, and a controller 170.

The communication unit 110 performs communication of the phone. That is, the communication unit 110 processes a signal received through a communication network, outputs the signal to the controller 170, and transmits a signal received from the controller 170 through the communication network.

The input unit 120 preferably comprises a touch screen or a key pad comprising various function keys, numeric keys, special keys, and/or character keys, and outputs a signal inputted by a user to the controller 170 so as to control an operation of the phone.

Particularly, the input unit 120 receives a signal for setting the information which will execute a voice recognition function. The voice recognition function is executed by the phone analyzing voice information received from the user and executing a function corresponding to the analyzed voice information. For this reason, the phone should store voice function information, in which function information is mapped to specific voice information.

The display unit 130 preferably displays various display data generated in the phone and a current operating state of the phone on a screen. The display unit 130 also preferably displays a window on the screen for setting voice information and function information. The display unit 130 may preferably be composed of a Liquid Crystal Display (LCD) or the like.

The voice recognition unit 140 recognizes voice information preferably received through a microphone 161, determines whether the voice information is included in voice function information stored in the storage unit 150, and outputs the result to the controller 170.

The storage unit 150 preferably stores programs and data, and particularly, stores voice function information necessary for general operation of a phone in a database form. An example of a voice function information database according to an exemplary embodiment of the present invention is shown in Table 1.

TABLE 1

| Execution condition | Voice information | Function information |
|---|---|---|
| When a call is received | Communication | Conversion to communication connection and speakerphone mode |
|  | Hold incoming call | Discontinue incoming call notification |
| During communication | Frog | End communication |
|  | Volume up | Increase volume of phone receiver |
|  | Volume down | Decrease volume of phone receiver |
|  | Connection to communication standby | Connection to communication standby function |
|  | End of communication standby | End communication standby function |

As shown in Table 1, the voice function information comprises function information and voice information. For example, when a phone call is received, if the user inputs voice information 'communication' to the phone preferably through the microphone, the phone determines whether the inputted voice information is stored in the storage unit 150. If the inputted voice information is stored in the storage unit 150, the phone recognizes the function information mapped to the voice information and executes the function of converting to a communication connection and speakerphone communication mode.

An audio processor 160 preferably comprises a coder/decoder (codec), which may comprise a data codec for processing packet data and an audio codec for processing an audio signal such as a voice. The audio processor 160 converts a voice signal received through the microphone 161 from the user to an electrical signal and outputs the signal to the voice recognition unit 140. The electrical signal received through a communication network is converted to a voice signal and the signal is outputted through a speaker 162. For this reason, the audio processor 160 preferably includes the microphone 161 and the speaker 162.

The controller 170 compares voice information inputted through the microphone 161 with voice information in the voice function information database stored in the storage unit 150. The controller 170 determines that the voice information inputted through the microphone is included in the voice information of the voice function information stored in the storage unit 150 from the voice recognition unit 140 and extracts the function information corresponding to the voice information from the storage unit 150.

The controller 170 controls the phone to perform the extracted function information. For example, when a spoken word 'communication' has been stored as voice information corresponding to a specific function of 'communication connection and speakerphone mode conversion' in the storage unit 150 of the phone, if the spoken word 'communication' is inputted through the microphone 161 by the user, the phone is converted to a communication connection and speakerphone mode and performs a communication service.

Figure 2:
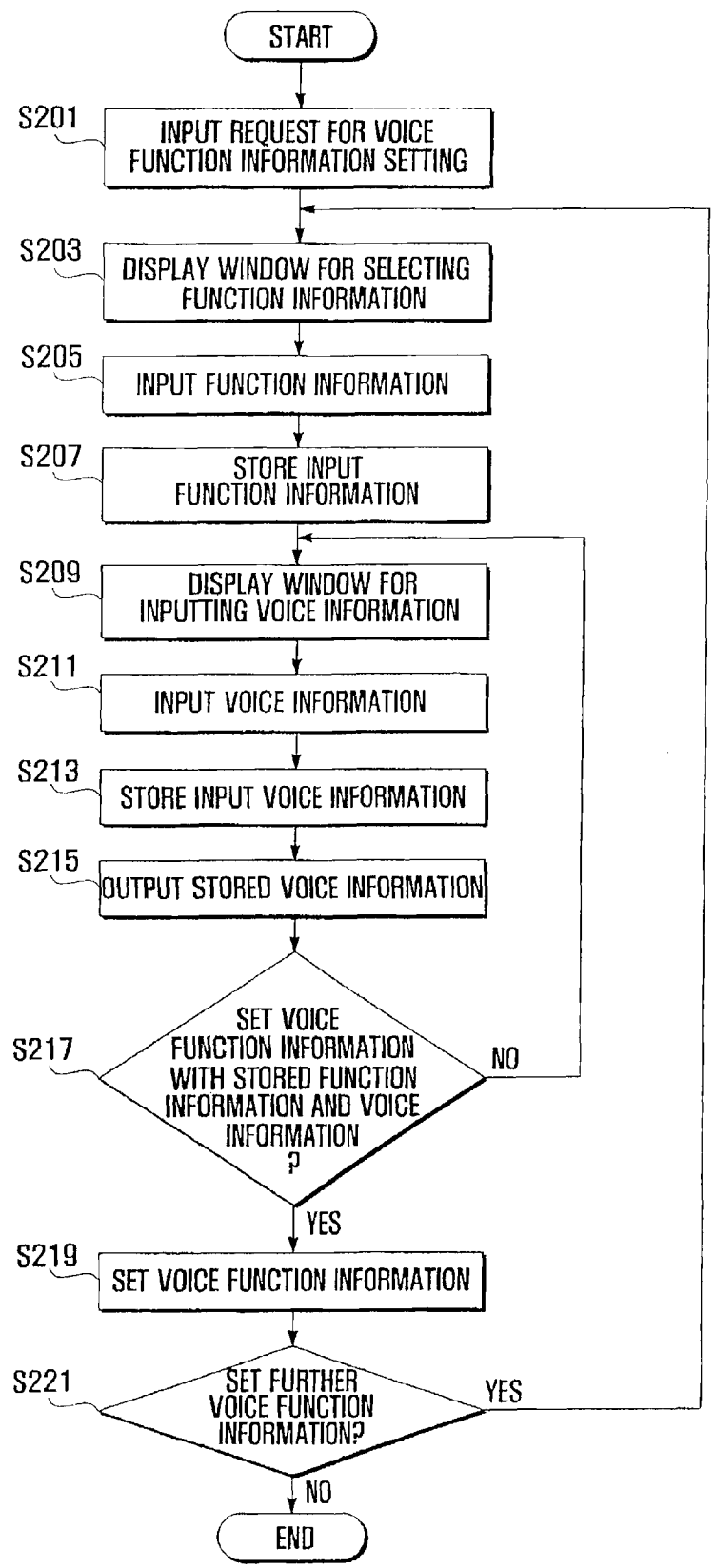
FIG. 2 is a flowchart illustrating a method of setting a voice recognition function in a phone according to an exemplary embodiment of the present invention.

FIG. 2 is a flowchart illustrating a method of setting a voice recognition function in a phone according to an exemplary embodiment of the present invention.

Referring to FIG. 2, a request signal for setting voice function information is inputted by a user (S201), and the phone preferably displays a window for selecting function information in a display unit (S203).

When the phone determines that function information is inputted by the user (S205), the phone stores the function information inputted by the user (S207).

Next, the phone preferably displays a window for inputting voice information to register with the inputted function information in the display unit (S209). When the phone determines that voice information is inputted by the user (S211), the phone stores the voice information (S213).

The phone outputs the stored voice information through a speaker so that the user may confirm whether unintended noise was included in the process of inputting the voice information (S215).

Next, the phone determines whether a request signal is inputted by the user (S217). The request signal, if inputted by the user, sets voice function information by mapping the function information inputted at step S205 to the outputted voice information at step S215.

If a request signal is inputted by the user, the phone sets the voice function information by mapping the voice information inputted at step S211 to the function information inputted at step S205 (S219). If a request signal is not inputted at step S217, the process returns to step S209.

Next, the phone determines whether a request signal for setting further voice function information is inputted by the user (S221). If a request signal for setting further voice function information is inputted, the process of registering voice information and function information is repeated by returning to step S203.

In the present exemplary embodiment of the present invention, voice function information is registered in order of function information and voice information, but of course the order of registering the information may be changed without departing from the scope and spirit of the present invention. For example, in an alternative embodiment, the step of storing voice information and its associated steps can be performed before the step of storing function information and its associated steps.

Figure 3:
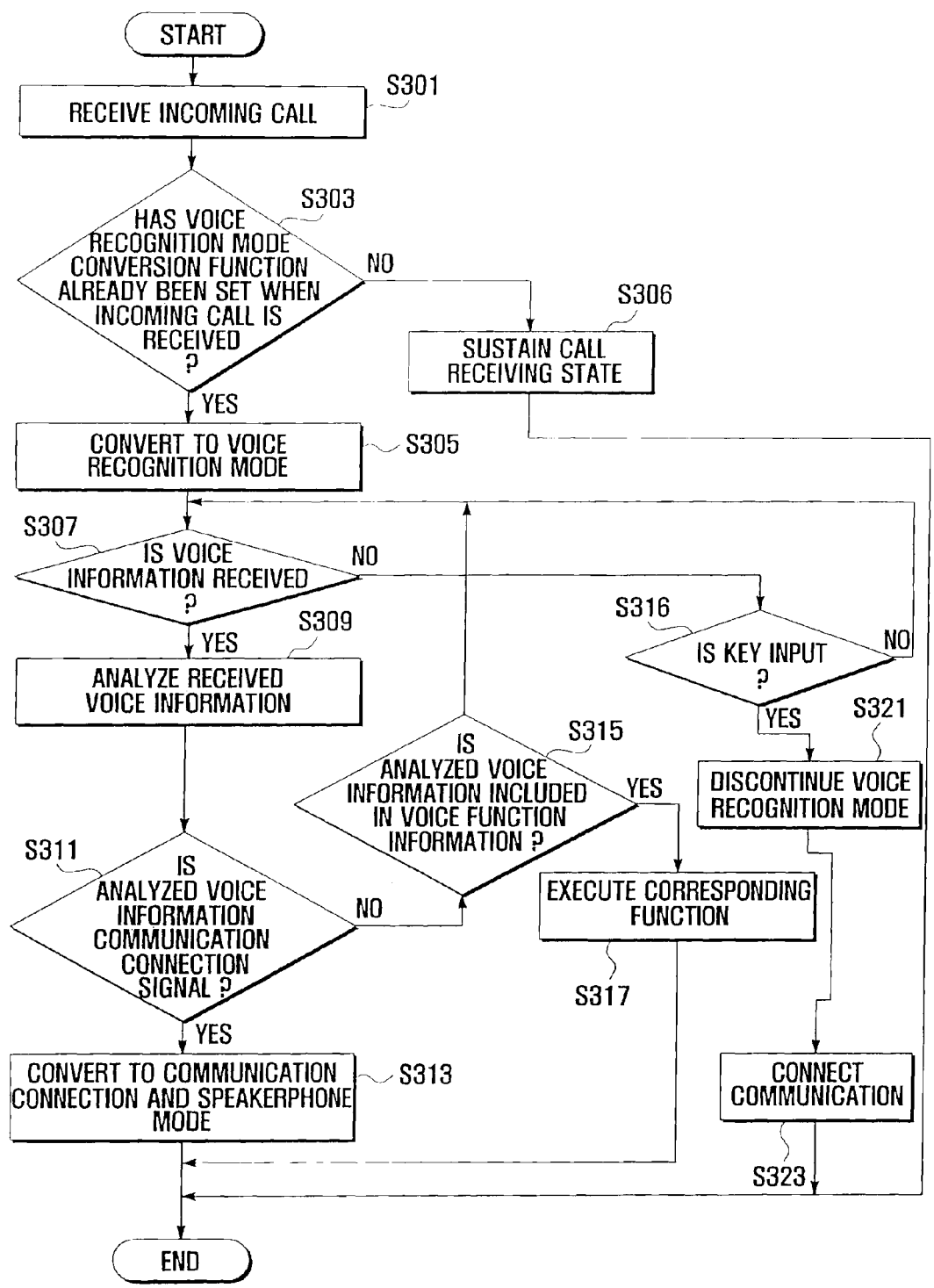
FIG. 3 is a flowchart illustrating a process of converting a mode of a phone to a communication connection and speakerphone mode according to an exemplary embodiment of the present invention.

FIG. 3 is a flowchart illustrating a process of converting a mode of a phone to a communication connection and speakerphone mode by the inputted voice information when a phone call is received according to an exemplary embodiment of the present invention.

Referring to FIG. 3, when a phone call is received (S301), the phone determines whether a voice recognition mode conversion function is set (S303). The voice recognition mode conversion function is a function of converting a mode of the phone to a voice recognition mode when a phone call is received.

If a voice recognition mode conversion function is set, the phone converts a current mode, preferably idle mode, to the voice recognition mode (S305), and if a voice recognition mode conversion function is not set, the phone sustains a current call signal receiving service (S306).

The phone then determines whether voice information is inputted by the user (S307). If voice information is inputted by the user, the phone analyzes the inputted voice information (S309).

Next, the phone determines whether the inputted voice information is 'communication' (S311). The 'communication' is voice information registered in the voice function information, and corresponds to a function of a communication connection and speakerphone mode conversion instruction.

If the inputted voice information is 'communication', the phone is converted to the communication connection and speakerphone mode (S313).

If the inputted voice information is not 'communication', the phone determines whether the analyzed voice information is voice information included in the voice function information (S315). If the analyzed voice information is voice information included in the voice function information, a function corresponding to the inputted voice information is executed (S317).

If voice information is not inputted by the user at step S307, the phone determines whether a key is inputted by the user (S316).

If a key is inputted by the user, the voice recognition mode is discontinued (S321), and the phone call is connected and communication is enabled (S323).

Figure 4:
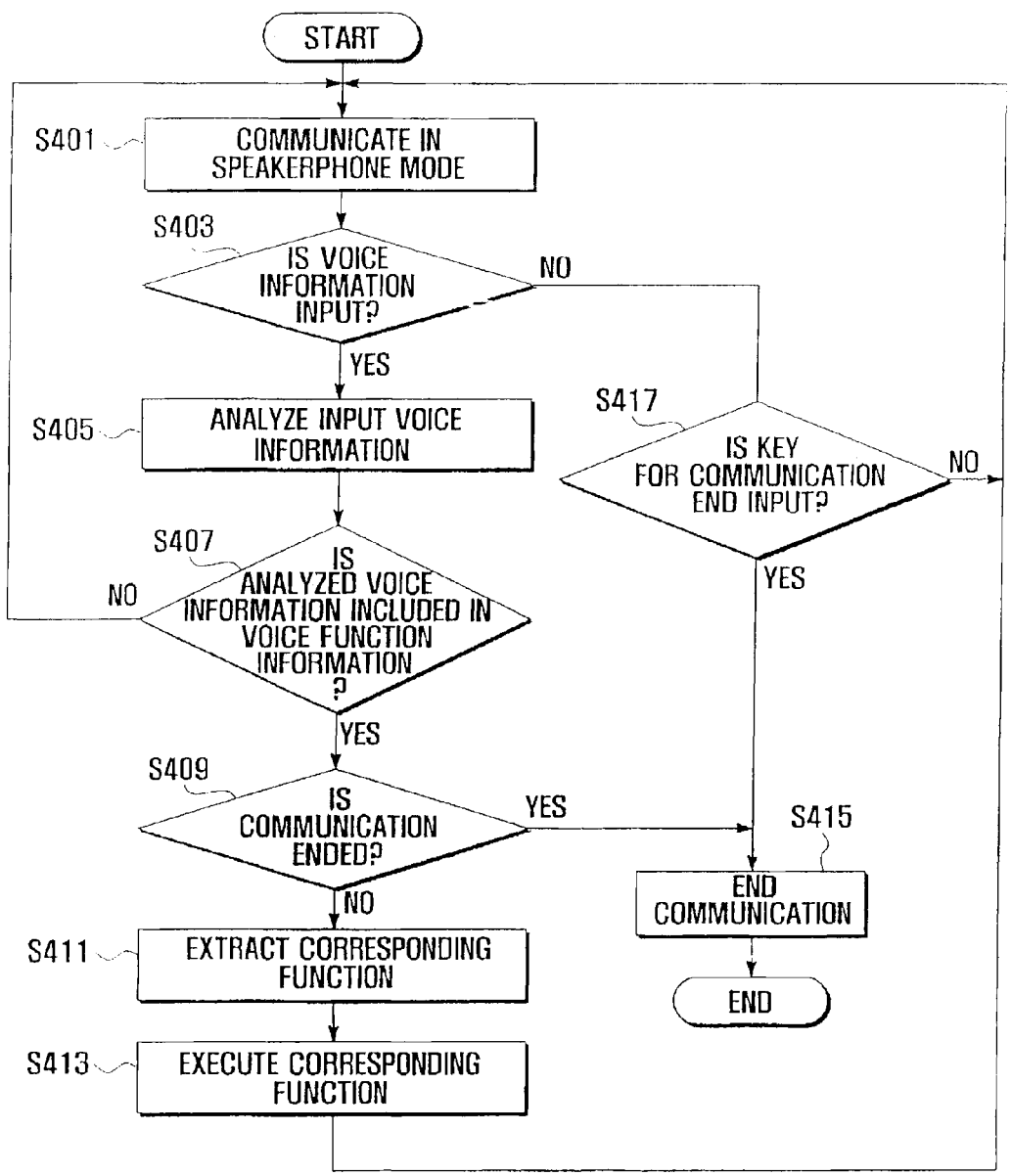
FIG. 4 is a flowchart illustrating a process of ending communication in a phone according to an exemplary embodiment of the present invention.

FIG. 4 is a flowchart illustrating a process of ending communication in a phone by voice information inputted during communication in a speakerphone mode according to an exemplary embodiment of the present invention.

Referring to FIG. 4, while a user communicates through a telephone in a speakerphone mode (S401), the phone determines whether voice information is inputted by the user (S403).

If voice information is not inputted by the user, the phone determines whether a key signal for requesting communication end is inputted (S417).

If a key signal for requesting communication end is inputted, communication ends (S415). If a key signal for requesting communication end is not inputted, a speakerphone communication service continues by returning to step S401.

If voice information is inputted at step S403, the inputted voice information is analyzed (S405). The phone determines whether the analyzed voice information is included in the voice information of the voice function information stored in the storage unit (S407).

If the analyzed voice information is included in the voice information of the voice function information stored in the storage unit, the phone determines whether the analyzed voice information is voice information regarding a communication end instruction (S409).

If the analyzed voice information is voice information regarding a communication end instruction, the currently executing speakerphone mode is deactivated and communication ends (S415).

If the analyzed voice information is not voice information regarding a communication end instruction at step S409, the function information corresponding to the analyzed voice information is extracted (S411) and the extracted function information is executed (S413).

Thereafter, the phone returns to step S401 in order to determine whether another voice information is inputted.

Figure 5:
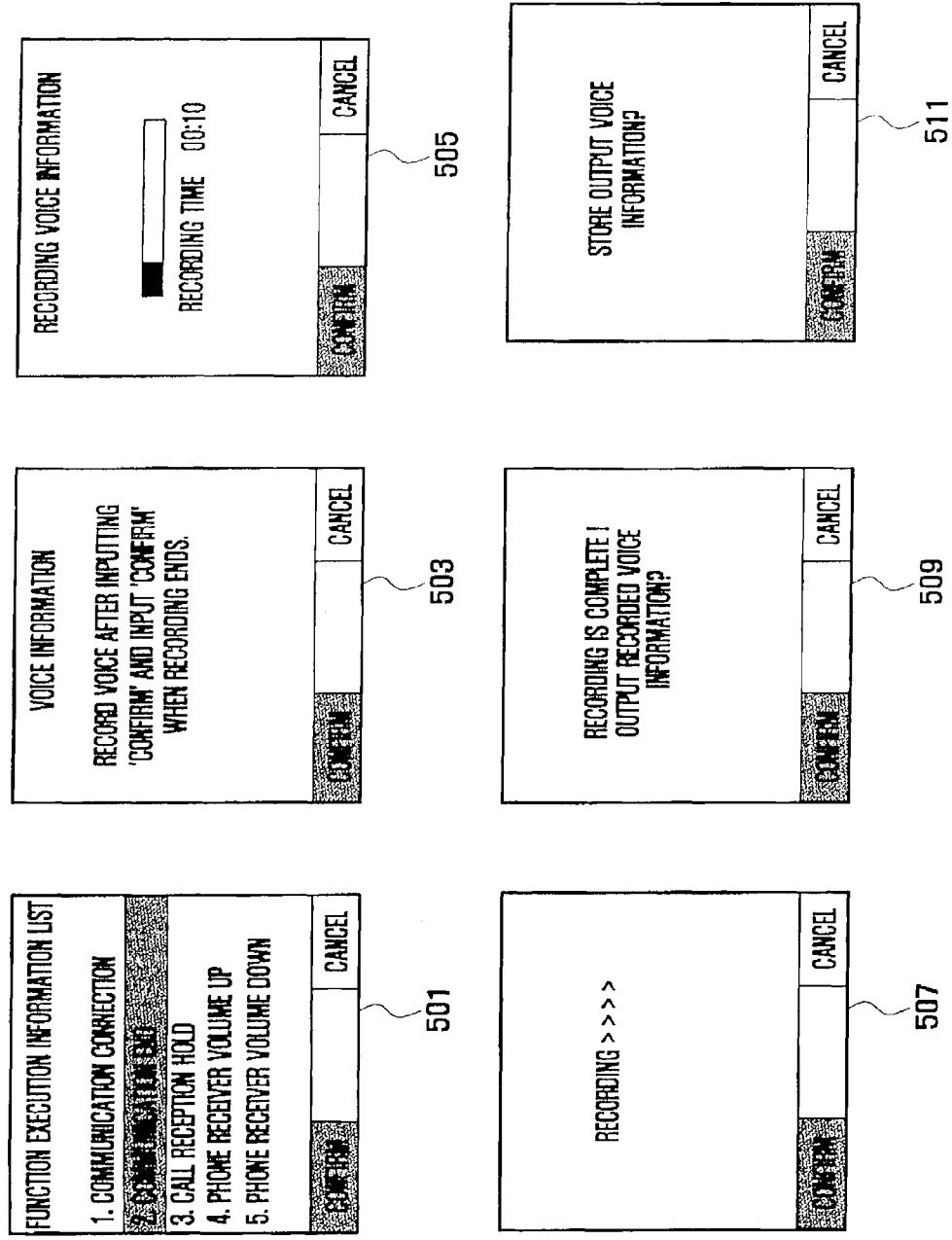
FIG. 5 is a diagram illustrating a screen for setting voice function information according to an exemplary embodiment of the present invention.

FIG. 5 is a diagram illustrating screen shots for setting voice function information according to an exemplary embodiment of the present invention.

If a request signal for setting voice function information is inputted by the user, the phone displays a list of function information in a display unit as shown in step 501.

If the user selects 'communication end', preferably on a screen in which the list of function information options is displayed, and inputs 'confirm', the phone stores the selected option 'communication end'.

The phone then preferably displays a window for inputting voice information corresponding to the inputted 'communication end' on a screen (503).

The user inputs 'confirm' and inputs voice information, for example by speaking a code word such as 'frog', then inputs again 'confirm' (505), so that the phone records the spoken word 'frog' as the input voice information (507).

Next, the phone outputs the voice information of the recorded spoken word 'frog' through a speaker so that the user may confirm whether unintended noise was recorded in the process of inputting voice information (509).

The phone inquires whether the outputted voice information should be stored (511) and, if the user inputs 'confirm', the phone sets 'frog' as voice information corresponding to the communication end function.

FIG. 6 is a diagram illustrating screen shots for executing a speakerphone communication function using voice function information according to an exemplary embodiment of the present invention.

Referring to FIG. 6, if a phone call is received in a phone in which a voice recognition mode conversion function is set, the phone is converted to a voice recognition mode.

In the example, a mobile terminal is in a state where a call is received from a caller number 010-123-4567 and a mode thereof is converted to a voice recognition mode (601). The voice recognition mode may be displayed using an icon as indicated by a reference numeral 602.

If the user inputs voice information 'communication', the phone performs communication connection (603), is converted to a speakerphone mode, and continues to sustain a voice recognition mode. The speakerphone mode may be displayed using another icon as indicated by a reference numeral 604.

The user sustains communication with a caller number 010-123-4567 using a speakerphone from now on.

The phone performs voice recognition of voice information inputted preferably through the microphone by the user and determines whether the recognized voice information is voice information included in voice function information stored in the storage unit.

If the recognized voice information is voice information included in voice function information stored in the storage unit, a function corresponding to the recognized voice information is executed.

For example, if the user inputs the voice information 'frog' during communication, a function 'communication end', which is the function corresponding to 'frog', is executed (605).

As described above, according to the exemplary embodiments of the present invention, when a phone call is received, a mode of a phone is converted to a speakerphone mode with a voice instruction using a voice recognition function, and thus communication can be performed without using a hand, thereby providing user convenience.

Exemplary embodiments of the present invention can also comprise computer readable codes on a computer readable medium. The computer readable medium can comprise any data storage device that can store data that can be read by a computer system. Examples of a computer readable medium include magnetic storage media (such as ROM, floppy disks, hard disks, and the like), optical recording media (such as CD-ROMs, DVDs, and the like), and carrier waves (such as transmission through the Internet via wired or wireless transmission paths). The computer readable medium can also be distributed over network coupled computer systems so that the computer readable code is stored and executed in a distributed fashion. Functional programs, codes, and code segments for accomplishing exemplary embodiments of the present invention can be easily construed as within the scope of the invention by programmers of ordinary skill in the art to which the present invention pertains.

While certain exemplary embodiments of the invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A method of communicating using a phone having a voice recognition function comprising:
   converting to an incoming call notification and voice recognition mode when a phone call is received;
   converting to a communication connection and speakerphone mode when voice information related to a communication connection instruction is recognized; and
   performing communication using a speakerphone.

2. The method of claim 1, wherein converting to an incoming call notification and voice recognition mode when a phone call is received comprises:
   determining whether a voice recognition mode has already been set when the phone call is received; and
   converting, if a voice recognition mode has already been set when the phone call is received, from an idle mode sustaining call receiving state to the voice recognition mode.

3. The method of claim 1, wherein converting to an incoming call notification and voice recognition mode when a phone call is received comprises ending the incoming call notification when voice information related to a phone call receiving hold instruction is recognized in an incoming call notification state.

4. The method of claim 1, further comprising setting voice function information.

5. The method of claim 4, further comprising ending communication when voice information related to a communication end instruction is recognized during communication using the speakerphone.

6. The method of claim 5, wherein setting voice function information comprises:
   inputting function information by a user;
   inputting voice information by the user; and
   setting, if a request signal for setting voice function information is inputted, voice function information by mapping the inputted voice information to the inputted function information.

7. The method of claim 6, wherein the voice function information is set by mapping the inputted voice information to the inputted function information so as to execute a specific function according to the voice information inputted by the user.

8. A phone having a voice recognition function and a speakerphone communication function, comprising:
   a communication unit for performing communication with other phones through a communication network;
   a microphone for receiving voice information;
   a speaker for converting an electrical signal to voice information and outputting the voice information;
   a voice recognition unit for recognizing voice information received through the microphone and outputting the recognized voice information;
   a storage unit for storing voice information regarding communication connection and communication end; and
   a controller for entering a communication connection and speaker communication mode when a voice recognition signal of communication connection is received from the voice recognition unit.

9. The phone of claim 8, wherein the controller drives the voice recognition unit when a phone call is received.

10. The phone of claim 9, wherein the controller end communication when a voice recognition signal of communication end is received from the voice recognition unit during communication using the speakerphone communication function.

11. A computer readable medium of instructions for communicating using a phone having a voice recognition function comprising:
- a first set of instructions for controlling the phone to convert to an incoming call notification and voice recognition mode when a phone call is received;
- a second set of instructions for controlling the phone to convert to a communication connection and speakerphone mode when voice information related to a communication connection instruction is recognized; and
- a third set of instructions for controlling the phone to perform communication using a speakerphone.

12. The computer readable medium of instructions of claim 11, wherein the first set of instructions for controlling the phone to convert to an incoming call notification and voice recognition mode when a phone call is received comprises:
- a first subset of instructions for controlling the phone to determine whether a voice recognition mode has already been set when the phone call is received; and
- a second subset of instructions for controlling the phone to convert, if a voice recognition mode has already been set when the phone call is received, from an idle mode sustaining call receiving state to the voice recognition mode.

13. The computer readable medium of instructions claim 11, wherein the second set of instructions for controlling the phone to convert to an incoming call notification and voice recognition mode when a phone call is received comprises instructions for controlling the phone to end the incoming call notification when voice information related to a phone call receiving hold instruction is recognized in an incoming call notification state.

14. The computer readable medium of instructions of claim 11, further comprising a fourth set of instructions for controlling the phone to set voice function information.

15. The computer readable medium of instructions of claim 14, further comprising a fifth set of instructions for controlling the phone to end communication when voice information related to a communication end instruction is recognized during communication using the speakerphone.

16. The computer readable medium of instructions of claim 15, wherein the fourth set of instructions for controlling the phone to set voice function information comprises:
- a first subset of instructions for controlling the phone to input function information by a user;
- a second subset of instructions for controlling the phone to input voice information by the user; and
- a third subset of instructions for controlling the phone to set, if a request signal for setting voice function information is inputted, voice function information by mapping the inputted voice information to the inputted function information.

\* \* \* \* \*